April 28, 1953
F. B. RECKER
2,636,400
REVERSIBLE POWER TRANSMISSION UNIT
Filed June 21, 1948
3 Sheets-Sheet 1
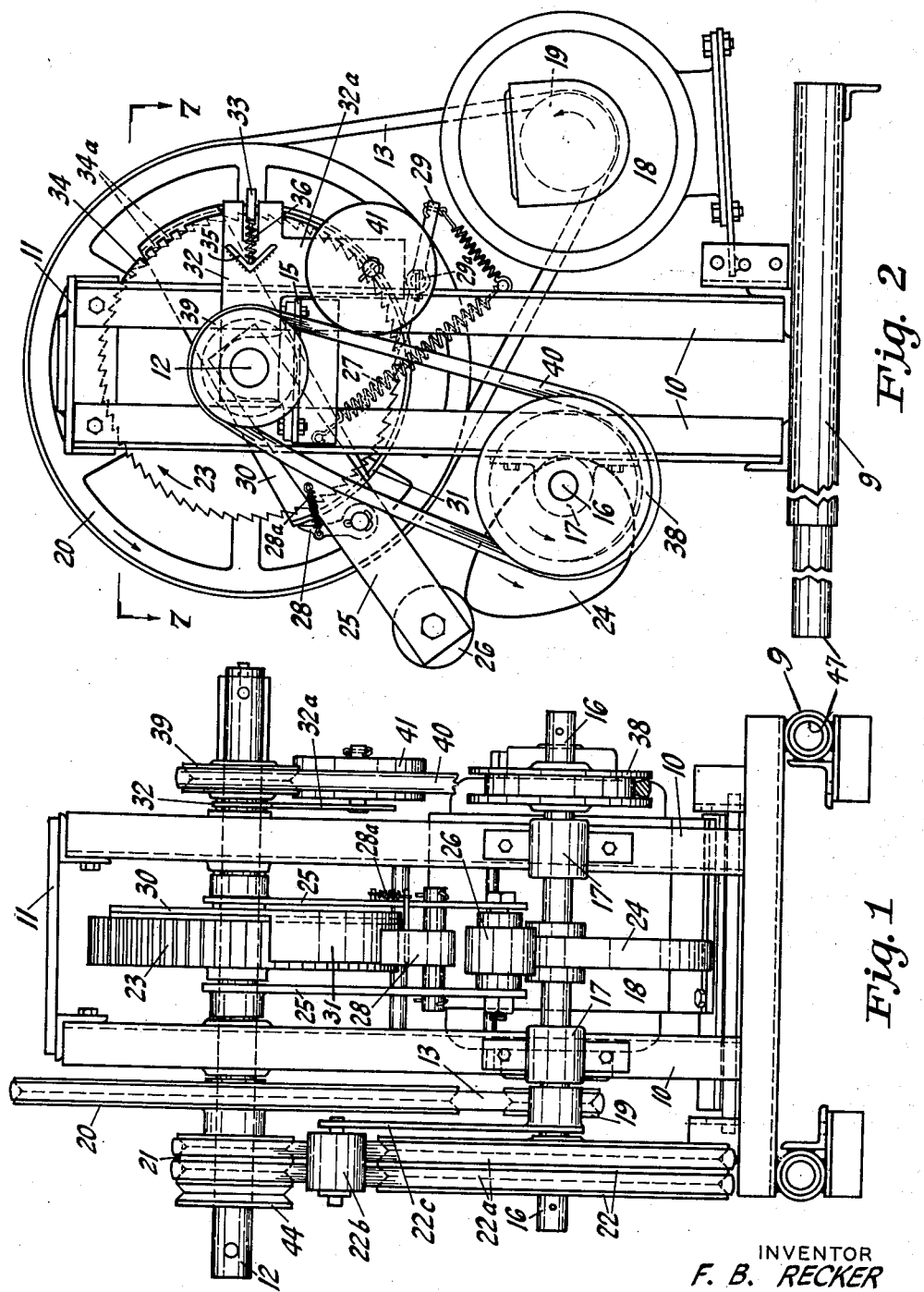
INVENTOR
F. B. RECKER
BY
Merrill M. Blackburn
ATTORNEY

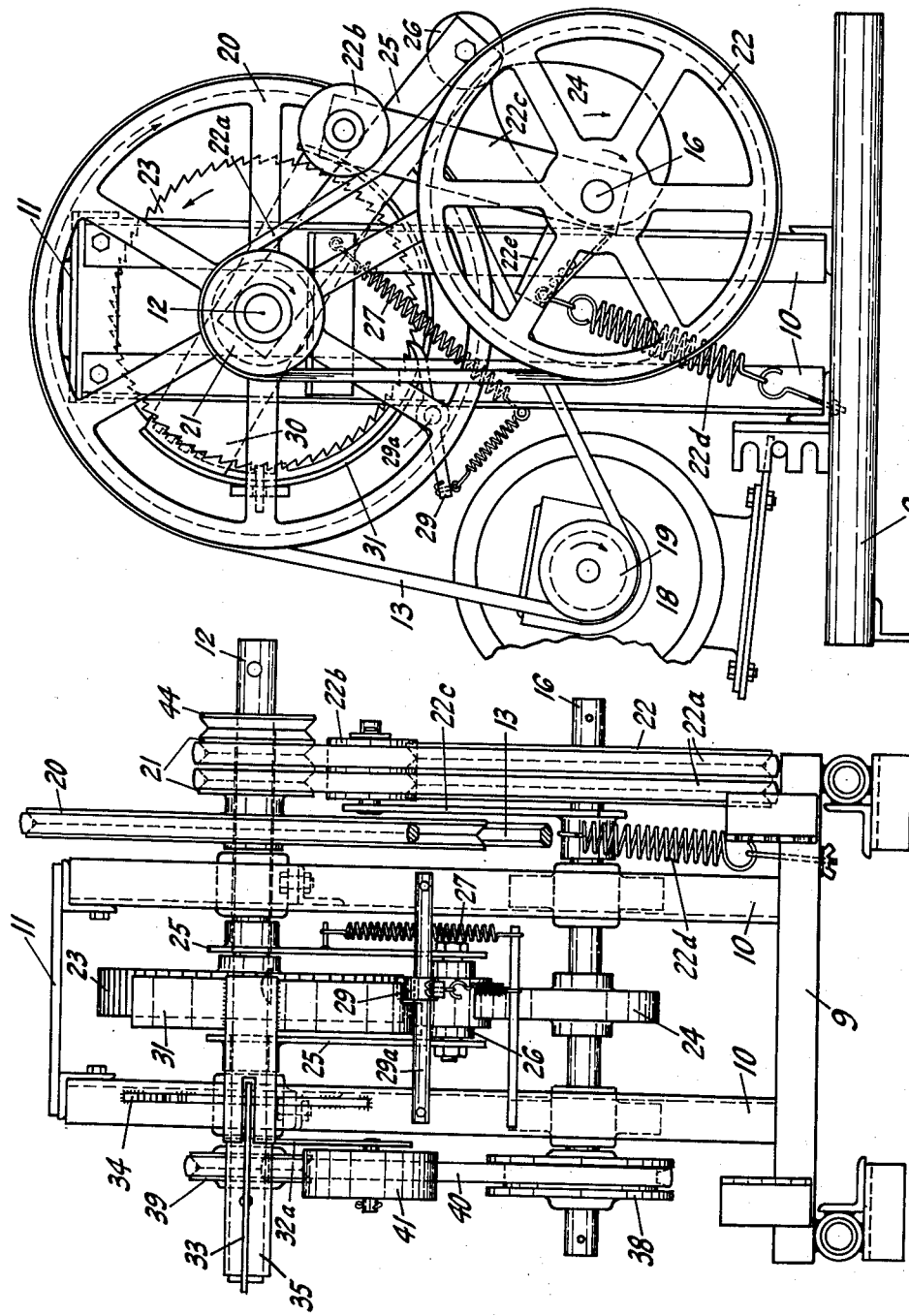

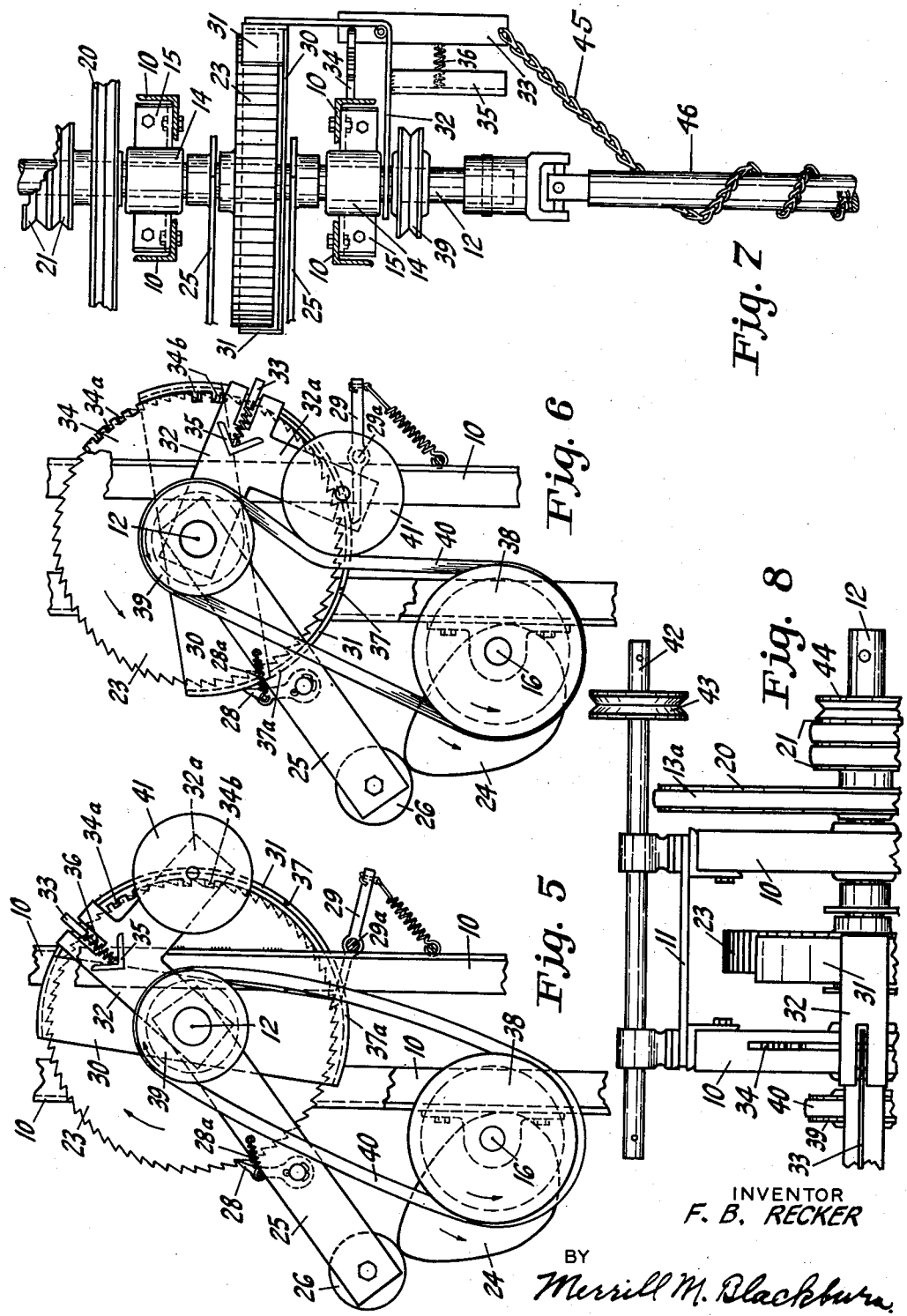

Patented Apr. 28, 1953

2,636,400

UNITED STATES PATENT OFFICE 2,636,400

REVERSIBLE POWER TRANSMISSION UNIT

Florian B. Recker, Hopkinton, Iowa

Application June 21, 1948, Serial No. 34,331

16 Claims. (Cl. 74—664)

My present invention relates to speed reducers of the type provided with a rapid action reverse mechanism. There are many applications for such a mechanism, as the unloading of farm wagons which require, for efficient operation, a speed reducer or the return operation may be very rapid, under light load. Such speed reducers, to be useful in a wide range of applications, need to be readily portable. Present speed reducers are so built that, when the rate of feed is changed, the applied force varies. Thus, in the unloading of a wagon, it is a decided advantage to be able to unload at a controlled rate to correspond with the rate of operation of equipment, such as an elevator. With present speed reducers, if the rate is increased, the force delivered is decreased.

Among the objects of the present invention are the provision of speed reducers of portable character which operate at reduced speed in one direction and can be reversed to operate at high speed in the opposite direction; the provision of such speed reducers which can be shifted from operation at reduced speed to reverse with facility and by simple and rugged structure; and the provision of a speed reducer in which the force applied to reduced speed is independent of the average reduced speed to which the speed reducer is adjusted.

An illustrative embodiment of this invention is disclosed in the following specification and in the accompanying drawings in which:

Fig. 1 is a front elevation;

Fig. 2 is a left end elevation;

Fig. 3 is a rear elevation with the motor removed in order better to show the construction;

Fig. 4 is a right end elevation;

Figs. 5 and 6 are partial left end elevations with parts broken away better to show the drive mechanism;

Fig. 7 is a plan view of the main drive shaft and of parts associated therewith; and Fig. 8 is a partial rear elevation of this preferred construction.

In the specific construction shown, the speed reducer is mounted on a base 9 and is supported thereon by four vertical frame members 10 which have their upper ends connected by braces 11. A main power shaft 12 is mounted in bearings 14 supported by crossbars 15 extending between the frame members in pairs so that a pair of frame members 10 is on each side of the shaft 12.

A jack shaft 16 is supported by bearings 17 carried by one pair of frame members 10 so that shaft 16 is parallel with shaft 12. A suitable power means may be provided for driving the jack shaft 16, inasmuch as the specific drive means for the jack shaft 16 does not constitute any part of the present invention except that there be means for driving said jack shaft constantly in one direction. However, the cam following arm 25 can be fastened up and the shaft 16 driven in either direction by reversing the motor 18, if such is used, or by turning the engine around, if an internal combustion engine is used. A suitable form of drive, as shown, is a motor 18 provided on its shaft with a pulley 19. A large pulley 20 is positioned on the main power shaft 12 for free rotation thereon. A belt 13 on the pulleys 19 and 20 provides means for driving the pulley 20 by the motor 18. A pair of pulleys 21 are carried by the shaft 12 for free rotation thereon and are secured to the pulley 20 to be driven thereby. A pair of pulleys 22, coplanar with pulleys 21, are secured in driving relation on the jack shaft 16. The pulleys 20 and 22 are of large diameter with relation to pulleys 19 and 21, respectively, whereby there is a substantial initial speed reduction from the motor speed to the speed of the jack shaft 16. A pair of belts 22a connect pulleys 21 and 22 in driving relation and are held taut by a spring-actuated tightener pulley 22b, carried by the arm 22c freely oscillatable on the shaft 16, under the influence of the spring 22d, which furnishes a spring connection between the frame 9 and the arm 22e, projecting laterally from the arm 22c.

The main power shaft 12 has a ratchet 23 secured thereon, which ratchet is driven stepwise from the jack shaft 16 and, in turn, drives the main power shaft 12. The mechanism for effecting this drive comprises a cam 24, secured to shaft 16, and a pair of arms 25, mounted on the shaft 12 to oscillate thereabout, with one arm positioned on each side of the ratchet 23. A cam follower 26 is mounted on and between the arms 25 at their outer free ends. The arms 25 are of such a length that the cam follower assumes a position in front of and above the cam 24. A spring 27, connected to one of the arms 25 and to a frame member 10, oscillates the arms to maintain contact of follower 26 and cam 24. A pawl 28 is pivoted between the arms 25 and positioned to rotate the ratchet 23 clockwise, as viewed in Fig. 2, the pawl 28 being provided with a spring 28a to move it into engagement with the ratchet 23.

A second pawl 29 is mounted on a shaft 29a carried by frame members 10. The pawl 29 is positioned to engage the lower portion of ratchet 23, as shown in Figs. 2 and 4, and is directed to operate in the same direction as the pawl 28.

An adjustable pawl controller is provided which has a plate 30 positioned between the ratchet 23 and one of the arms 25 and is pivoted to oscillate freely on shaft 12. The two ends of the plate 30 are in proximity to the periphery of the ratchet 23 and are secured to the ends of a curved shield 31 which extends about the lower portion of the ratchet 23. An arm 32 is pivoted to swing on shaft 12 outside of the frame member 10, on the left side. The outer end of arm 32 extends parallel to the shaft 12 and is secured to the shield 31. In order to hold the pawl controller in adjusted position, a latch arm 33 is pivoted to the arm 32, at the bight portion thereof, and this is movable into engagement with notches 34a and 34b in a notched sector 34. An arm 35 is mounted on the arm 32 to support a spring 36 for holding the latch arm 33, as shown in Fig. 7, in engagement with the notched sector 34.

The shield 31, intermediate its ends, as shown at 37 and 37a in Fig. 5, extends only about half the width of the ratchet 23. This is sufficient so that, when the shield is turned to a position between the pawl 28 and the ratchet 23, the pawl 28 is held away from the ratchet. The shield 31 is provided with a shoulder 37 at a mid-point thereof, as shown by Figs. 5 and 6. Between the shoulders 37 and 37a, the shield 31 is of decreased width. The shield is of such a width, forwardly of shoulder 37, that the pawl 29 may engage the ratchet, but of a width, rearwardly of the shoulder 37, that when the shield is turned forwardly, the pawl 29 is disengaged from the ratchet and held away therefrom, as shown in Fig. 6. The pawl 28 can engage the ratchet 23 only when the shield 31 is moved backwardly until the edge of ratchet 23 is uncovered and exposed so that the pawl 28 drops into notches in the edge of the ratchet 23.

In order to provide a reverse drive for the power shaft 12, a pulley 38 is provided at the left end of the jack shaft 16 and a pulley 39 in line therewith on shaft 12 for driving engagement through a belt 40. This belt 40 is provided about pulleys 38 and 39, and a belt tightening pulley 41 is carried on a stub shaft carried by the arm 32a. When the arm 32 is lowered to move the shield into disengaged position of the pawls of the controller, the controller first causes disengagement of the pawl 28 to prevent further forward driving of the shaft 12, as shown in Fig. 6, and then, upon further movement of the controller, disengagement of the pawl 29 and engagement of the belt-tightening pulley 41, in order to cause reversal of the drive to the power shaft 12.

With the speed reducer in the neutral position, as shown in Figs. 2 and 4, the jack shaft 16 is constantly driven. The cam 24, being rotated, oscillates the arms 25 and pawl 28 about the main shaft 12. The pawl 29 prevents the ratchet 23 from turning backwardly. In this position, the latch arm 33 is engaged in a notch in the notched sector 34. The latch arm 33 may be moved out of engagement with the sector 34 and then moved upwardly, thereby moving the cam controller rearwardly. The pawl 29 remains in engagement with the ratchet 23. The curved shield will cover the ratchet through a variable portion of the path of movement of the pawl 28. By adjusting the position of the controller, the exact number of teeth that the ratchet 23 is advanced per complete revolution of the jack shaft may be regulated. A plurality of notches are provided in the sector 34 to hold the controller in various positions in which varying numbers of teeth of the ratchet are advanced per revolution.

A chain 45 may be secured to the latch arm 33 and have its second end secured to a power shaft 46 to act as a safety or automatic stop. The chain must be long enough to allow the desired movement of the part which is to be operated, as, for example, an unloading endgate. The operation of the machine must be so timed that the latch 33 will be tripped in time to allow the shield 31 to be moved under the pawl 28 to stop continued rotation of the ratchet 23 and advancement of the endgate. Movement of the shield 31 will be caused by chain 45 pulling on the latch 33 which is connected indirectly to the shield. This causes the shield to lift the pawl 28 out of engagement with the ratchet 23. If the other end of shaft 12 is used for taking off power, when the unit is put on the opposite side of the wagon, the power shaft 46 and its universal are moved to the opposite side of the unit and a pipe applied to the end of shaft 12, from which the universal was removed, the chain 45 being fastened to this pipe to serve as a stop or automatic shut-off for discontinuing rotation of shaft 12. Thus, this pipe, substituted for the shaft 46, acts to wind up the chain 45 and to stop the rotation of the ratchet 23.

When the arm 32 is moved sufficiently to bring the shield 31 under the pawl 28 to prevent its engagement with the ratchet 23, the belt-tightener pulley 41 is brought into engagement with the belt 40 and further movement tightens the belt sufficiently to cause the shaft 12 to be rotated in reverse and at considerably higher rate of speed than when driving forwardly.

It is to be understood, as between variant positions of the pawl controller and despite the fact that the average number of revolutions per minute of the main shaft will vary, that there is no difference in mechanical advantage with the differing drive rates. This makes possible the powering of the speed reducer at the lowest horsepower which will handle the expected load. This arrangement overcomes the frequent disadvantage of the necessity of having much more power available than necessary for low speed operation in order to move the load at higher rates.

When the pawl controller is depressed from driving position to beyond neutral position, the pulleys 38 and 39, together with their associated belt, drive the shaft 12 in reverse. As the controller is moved from neutral to reverse, the shoulder 37 causes disengagement of the pawl 29, thereby freeing the shaft for reverse drive. The pipes 47, sliding fairly freely in the pipes of the base 9, furnish an extended base for the machine to prevent it from tipping over under a heavy load when in use. These pipes may be of any length necessary to keep the machine from tipping.

This machine may be used as a speed reducer in powering an elevator or in any other operation requiring a slow speed. For example, the shaft 16 may be used for driving an auger conveyor placed at the rear end of a wagon, or for any other purpose for which this speed reducer is adapted. Furthermore, the shaft 42 may be connected to the beater shaft 71 of the structure shown in my application, Serial No.

707,105, now Patent No. 2,463,643. The shaft 16 may be connected to an auger for driving the same and, at the same time, shaft 12 may be used for driving the winding drum for the endgate cables and shaft 42 may be used for operating the beaters 70—73 and endgate 65 of my application, Serial No. 707,105, now Patent No. 2,463,643.

The above described embodiment is illustrative of the present invention. It is obvious that various modifications of the invention may be made without departing from the spirit thereof. Thus, when electric power is not available, the pulleys 21 may be driven by a pulley 43 mounted on a jack shaft 42, carried by bearings at the upper ends of the frame members 10, which pulley 43 is belted to a pulley 44 secured to the pulleys 21. Also, the power take-off shaft of a tractor may be connected to either end of shaft 42 to get any desired speed reduction. Likewise, other reversing drive means may be employed.

Having now described my invention, I claim:

1. A speed reducer which comprises a main power shaft supported by a frame, a ratchet fixed to said shaft, a jack shaft supported by said frame parallel to said main shaft and having a cam secured thereon, a holding pawl carried by said frame for engagement with said ratchet and for preventing turning of said ratchet in one direction, a driving pawl supported for oscillation about said main shaft, a cam follower mounted for motion with said driving pawl and for engagement with said cam, whereby rotation of said cam oscillates said driving pawl for engagement with and driving of said ratchet, and a pawl controller mounted for oscillation about said main shaft to predetermined control positions, said controller having a shield movable about said ratchet to positions wherein it is interposed between said ratchet and both of said pawls and being movable to other positions in which said holding pawl is in constant engagement with said ratchet, and a portion of said shield is movable into the path of movement of said driving pawl various distances whereby variant numbers of ratchet teeth are moved ahead upon each revolution of said jack shaft.

2. A speed reducer in accordance with claim 1 in which said shield has portions severally engageable with each of said pawls to hold said pawls out of engagement with said ratchet, said portions being spaced about said controller so that, upon movement of said controller into driving position, the holding pawl is in constant engagement with said ratchet, said controller being movable from driving position to a neutral position in which complete disengagement of said oscillating pawl occurs in any position of the cam follower while said holding pawl remains in engagement with said ratchet, said controller being movable farther into a reverse position in which both of said pawls are disengaged from said ratchet, and means actuated by movement of said controller into its reverse position for driving said power shaft in a reverse direction.

3. A speed reducer which comprises a main power shaft supported by a frame, a ratchet fixed to said shaft, a jack shaft supported by said frame parallel to said main shaft and having a cam secured thereon, a pawl carried by said frame for engagement with said ratchet and for preventing turning of said ratchet in one direction, a driving pawl supported for oscillation about said main shaft, a cam follower mounted for motion with said driving pawl and for engagement with said cam, whereby rotation of said cam oscillates said driving pawl for engagement with and driving of said ratchet, and a pawl controller mounted for oscillation about said main shaft to predetermined control positions, said controller having a shield movable about said ratchet to positions wherein it is interposed between said ratchet and said pawls and being movable to positions in which variant numbers of ratchet teeth are moved ahead upon each revolution of said jack shaft, said shield having portions engageable to move both of said pawls to disengaged position, and pawl and ratchet means actuated by the controller in a position in which said pawls are disengaged for effecting reverse drive of said main power shaft.

4. A step by step drive comprising a ratchet secured to a driven shaft, a pawl pivotally mounted upon a fixed pivot for engagement with and disengagement from said ratchet, a shiftable pawl mounted for oscillatory movement about said shaft and for engagement with and disengagement from said ratchet, spring means associated with each of said pawls to urge them into engagement with said ratchet, and a pawl controller extending partly about said ratchet having portions for severally holding said pawls out of engagement with said ratchet and being movable into positions about said shaft in which both of said pawls are in engagement with said ratchet, said controller being so proportioned that, in a position between engaged and disengaged positions of both of said pawls, the portion of the controller for holding the shiftable pawl out of engagement with the ratchet holds said shiftable pawl out of such engagement in all oscillatory positions of said shiftable pawl, while the portion of the controller for holding the first pawl out of engagement is in inoperative position, allowing engagement of said first pawl.

5. In a speed reducer of the character defined, in combination, a framework, an output shaft rotatably supported by the framework, an input shaft rotatably supported on said framework, a cam carried by and rotating with said input shaft, a pair of arms mounted freely on the output shaft and oscillated by said cam, a ratchet securely mounted on said output shaft, a pawl connecting said arms and ratchet to impart intermittent motion to the output shaft, means for holding the pawl out of engagement with the ratchet, a single pulley on the input shaft, said single pulley being grooved, a single pulley secured to the output shaft in alignment with the single pulley on the input shaft, a belt connecting the two last mentioned pulleys, and means for tightening or loosening the belt to cause it to drive the single pulley on the input shaft, when tightened, or, when loosened, to enable the output shaft to run in the opposite direction.

6. A structure as defined by claim 5 in which the means for holding the pawl out of engagement with the ratchet is an arcuate shield partially enclosing the periphery of the ratchet and so positioned that the pawl may slide on the face of the shield and be held thereby from contact with the ratchet.

7. In a mechanism of the nature described, the combination of a main shaft, a ratchet mounted thereon, pawls engaging said ratchet in operative relation, a shield covering, in part, the notches in said ratchet, said shield being oscillatable about said shaft and ratchet and varying the number of notches exposed to said pawls whereby to regulate the rate at which the ratchet is advanced, a framework supporting said main shaft, a notched sector carried by said framework in proximity to said ratchet, a supporting arm pivotally mounted on said shaft and having its end portions secured to the shield, a latching dog pivotally mounted upon the supporting arm in a position to engage the notches in the notched sector, an extension shaft connected to said main shaft, and flexible means connecting said extension shaft and the end of the latching dog remote from the notched sector, said flexible means, when wound on said extension shaft, serving to turn the latching dog about its pivot and release it from the sector, whereby to allow the supporting arm to turn about the main shaft and bring the shield between the pawls and the ratchet so that the pawls are held out of engagement with the ratchet and rotation thereof is stopped.

8. In a speed reducer of the character defined, in combination, a framework, a main shaft rotatably supported by the framework, a jack shaft rotatably supported on said framework, a cam carried by and rotating with said jack shaft, a pair of arms mounted freely on the main shaft and oscillated by said cam, controllable means for driving said main shaft in one direction from said jack shaft, a single grooved pulley on the jack shaft, a single pulley secured to the main shaft in alignment with the single pulley on the jack shaft, a belt connecting the two last mentioned pulleys, means for tightening or loosening the belt to cause it to drive the single pulley on the jack shaft, when tightened, or, when loosened, to enable the main shaft to run in the the opposite direction, and means interconnecting said belt tightening means with said controllable means.

9. A speed reducer which comprises a main power shaft supported by a frame, a ratchet fixed to said shaft, a jack shaft supported by said frame parallel to said main shaft and having a cam secured thereon, a pawl carried by said frame for engagement with said ratchet and for preventing turning of said ratchet in one direction, a driving pawl supported for oscillation about said main shaft, a cam follower mounted for motion with said driving pawl and for engagement with said cam, whereby rotation of said cam oscillates said driving pawl for engagement with and driving of said ratchet, and a pawl controller mounted for oscillation about said main shaft to predetermined control positions, said controller having a shield movable about said ratchet to positions wherein it is interposed between said ratchet and said pawls and being movable to positions in which variant numbers of ratchet teeth are moved ahead upon each revolution of said jack shaft while said first pawl remains in engagement with said ratchet, said shield having portions engageable with said pawls to move both to disengaged positions, controllable means for driving said main power shaft in a direction opposite to the direction it is driven by the oscillations of said cam follower, and means interconnected with said pawl controller for controlling said last named controllable means.

10. A reversible power transmission unit comprising an input shaft, an output shaft, a cam driven by said input shaft, pawl and ratchet means for driving said shaft, controllable means for releasing said pawls of said pawl and ratchet means, to permit said output shaft to rotate in the other direction, a controllable connection between said input shaft and said output shaft by-passing said ratchet and pawl means for driving said output shaft in the other direction, and means interconnecting said pawl releasing controllable means and said controllable connection for causing said controllable connection to drive said output shaft in said other direction when said pawl means is released.

11. A power transmission unit comprising a main shaft, a ratchet mounted thereon, a driving pawl engaging said ratchet, a shield covering, in part, the notches in said ratchet, said shield being oscillatable about said shaft and ratchet and varying the number of notches exposed to said pawl whereby to regulate the rate at which the ratchet is advanced, a framework supporting said main shaft, a notched sector carried by said framework in proximity to said ratchet, a supporting arm pivotally mounted on said shaft and having its end portions secured to the shield, a latching dog pivotally mounted upon the supporting arm in a position to engage the notches in the notched sector, an extension shaft connected to said main shaft, and means actuated by said extension shaft and responsive to a predetermined number of rotations thereof for shifting said latching dog about its pivot and releasing it from said sector, whereby to allow the supporting arm to turn about the main shaft and bring the shield between the pawl and the ratchet so that the pawl is held out of engagement with the ratchet and rotation thereof is stopped.

12. A power transmission unit comprising a main shaft, a frame work supporting said shaft, a ratchet mounted thereon, a driving pawl engaging said ratchet, means for oscillating said pawl to drive said ratchet, a shiftable shield adapted when shafted to disengage said pawl from said ratchet and terminate the drive thereto, a notched sector carried by said framework in proximity to said ratchet, a supporting arm pivotally mounted on said shaft and having its end portion secured to said shield, a latching dog pivotally mounted upon the supporting arm in a position to engage the notches in the notched sector, an extension shaft connected to said main shaft, and means actuated by said extension shaft and responsive to movement thereof for shifting said latching dog about its pivot and releasing it from said sector, whereby further movement of said extension shaft causes said supporting arm to turn about the main shaft and bring said shield between said pawl and the ratchet so that said pawl is held out of engagement with the ratchet and rotation of said main shaft is stopped.

13. A drive mechanism, comprising a frame, a ratchet, a shaft in the frame on which the ratchet is mounted, a spring-actuated pawl for engagement with said ratchet to prevent, when desired, rotation of the ratchet in one direction, a second pawl for engagement with said ratchet, a pivotally mounted lever on which said second pawl is mounted and with which it oscillates, rotating means engaging and oscillating said lever, guards for limiting the amount of rotation which the pawls may transmit to the ratchet, the rotating means for oscillating the lever being mounted on a second shaft which has a belt pulley mounted thereon, a second belt pulley, a belt connecting the two belt pulleys, a belt tightening means engaging said belt by means of which the belt may be made tight enough to transmit driving force from one belt pulley to the other, the belt tightening means, when it is tight enough to transmit driving force from one belt pulley to the other, also moving the guards into position to prevent the pawls from driving the ratchet.

14. Operating means comprising a framework, a shaft extending transversely therethrough, a gearing in the framework, a shaft extending outwardly from the framework, a cam on said shaft, a roller engaging the cam surface of the cam, a second shaft extending outwardly from the framework, a ratchet carried by the second shaft, a pawl carried by said framework and engaging said ratchet, an arm pivotally mounted on said second shaft and carrying said roller, a pawl carried by said arm and engaging said ratchet, said cam causing oscillation of said arm and the pawl carried by the arm, said pawl causing rotation of said ratchet, belt pulleys carried by said shafts, in alignment, a belt connecting said pulleys, a cross-arm carried by said second shaft, a belt-tightener carried by said cross-arm, means carried by said cross-arm and holding said pawls out of engagement with the ratchet when the belt-tightener is operated to tighten the belt, and means serving to allow the pawls to engage the ratchet and rotate the same when the belt-tightener is not actuated into tightening position.

15. In a drive mechanism, a frame, a shaft extending through said frame, an arm pivotally mounted on said shaft to be oscillated by a cam, a wheel mounted on said arm to provide an antifriction contact between said arm and said cam, a gearing in said frame for driving said cam, a second shaft forming part of said gearing, said cam being mounted on said second shaft and rotated thereby as said second shaft is rotated, a belt pulley mounted on said second shaft, the wheel mounted on said arm being oscillated by said cam, a ratchet mounted on said first shaft for driving said shaft, a pawl supported on said frame and engaging said ratchet for preventing retrograde motion of the ratchet when the ratchet is engaged by the pawl, a second pawl pivoted on said arm and engaging said ratchet for driving said ratchet, a belt pulley mounted on said first shaft, a belt connecting said pulley on said first shaft and the belt pulley mounted on said second shaft, a second arm pivotally mounted on said first shaft, and a belt-tightener carried by said second arm and capable of tightening said belt, the second arm, when oscillated, causing the belt to be tightened and driven by rotation of said second shaft and causing the pawls to be removed from engagement with the ratchet.

16. A drive mechanism comprising the combination of a frame, a shaft extending on both sides of the frame, a ratchet on said shaft and secured thereto, a pawl secured to the frame and engaging the ratchet to prevent retrograde motion thereof when the ratchet is driven as a ratchet, an arm pivoted to said shaft and having a pawl pivotally carried by the arm in engagement with the ratchet, a wheel carried by the end of the arm, a second arm pivotally carried by the first shaft and having a guard extending over the edge of the ratchet and serving as means for holding said pawls away from the ratchet when the second arm is turned about the first shaft, a belt pulley secured to the first shaft, a gearing secured in said frame, said gearing having a second shaft parallel with the first shaft, a drive for the gearing, a cam mounted on the second shaft and engaged by the wheel, the cam and wheel causing the first arm to oscillate, the second shaft having a second belt pulley mounted thereon, and a belt around the pulleys and driving the first shaft from the second shaft, the guard holding the pawls away from the ratchet when the second arm is so turned about the first shaft that tightening of the belt is caused.

FLORIAN B. RECKER.

References Cited in the file of this patent

UNITED STATES PATENTS

| Number | Name | Date |
|---|---|---|
| 855,039 | Baron | May 28, 1907 |
| 1,138,970 | Pierce | May 11, 1915 |
| 1,226,988 | Ogg | May 22, 1917 |
| 1,314,598 | Luschka et al. | Sept. 2, 1919 |
| 1,523,695 | Laub | Jan. 20, 1925 |
| 1,946,807 | Neighbour | Feb. 13, 1934 |
| 2,145,942 | McAdams | Feb. 7, 1939 |
| 2,230,511 | Luttrup | Feb. 4, 1941 |
| 2,302,879 | Neighbour et al. | Nov. 24, 1942 |
| 2,488,766 | Moss | Nov. 22, 1949 |
| 2,504,623 | Barker | Apr. 18, 1950 |

FOREIGN PATENTS

| Number | Country | Date |
|---|---|---|
| 582,448 | France | Dec. 18, 1924 |